(12) United States Patent
Matsumura et al.

(10) Patent No.: US 12,267,156 B2
(45) Date of Patent: Apr. 1, 2025

(54) TERMINAL, RADIO COMMUNICATION METHOD, AND SYSTEM

(71) Applicant: NTT DOCOMO, INC., Tokyo (JP)

(72) Inventors: Yuki Matsumura, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/170,133

(22) Filed: Feb. 16, 2023

(65) Prior Publication Data

US 2023/0198656 A1 Jun. 22, 2023

Related U.S. Application Data

(63) Continuation of application No. 17/057,475, filed as application No. PCT/JP2019/020402 on May 23, 2019, now abandoned.

(30) Foreign Application Priority Data

May 23, 2018 (JP) ................................. 2018-110697

(51) Int. Cl.
*H04L 1/00* (2006.01)
*H04L 1/1867* (2023.01)
(Continued)

(52) U.S. Cl.
CPC .......... *H04L 1/0004* (2013.01); *H04L 1/0003* (2013.01); *H04L 1/189* (2013.01);
(Continued)

(58) Field of Classification Search
CPC ..... H04L 1/0004; H04L 1/189; H04L 5/0048; H04L 1/0016; H04L 1/0025;
(Continued)

(56) References Cited

U.S. PATENT DOCUMENTS

2010/0135181 A1 6/2010 Earnshaw et al.
2011/0299500 A1 12/2011 Papasakellariou et al.
(Continued)

FOREIGN PATENT DOCUMENTS

CN 113242108 A * 8/2021 .......... H03M 13/116

OTHER PUBLICATIONS

Tseng et al., "Sidelink measurement Report design for Group-based Sidelink", U.S. Appl. No. 62/754,716, filed Nov. 2, 2018, Total pp. 20 (Year: 2018).*

(Continued)

*Primary Examiner* — Shah M Rahman
(74) *Attorney, Agent, or Firm* — Osha Bergman Watanabe & Burton LLP

(57) ABSTRACT

A terminal is disclosed including a processor that determines, when retransmission of a side channel in a communication between a plurality of terminals is performed, a modulation order for the retransmission of the side channel by using a MCS table based on side control information; a transmitter that transmits the side channel based on the determined modulation order, and a receiver that receives downlink control information including at least a UL-SCH indicator field, wherein the processor, if retransmission of an uplink shared channel is performed, determines a time density of a phase tracking reference signal (PTRS) based on whether a modulation and coding scheme (MCS) index is larger than a certain value, and wherein the transmitter transmits the PTRS. In other aspects, a radio communication method, and a system are also disclosed.

4 Claims, 13 Drawing Sheets

| Scheduled MCS | Time density($L_{PT-RS}$) |
|---|---|
| $I_{MCS} <$ ptrs-$MCS_1$ | PT-RS is not present |
| ptrs-MCS1 $\leq I_{MCS} <$ ptrs-MCS2 | 4 |
| ptrs-MCS2 $\leq I_{MCS} <$ ptrs-MCS3 | 2 |
| ptrs-MCS3 $\leq I_{MCS} <$ ptrs-MCS4 | 1 |

(51) Int. Cl.
  *H04L 5/00* (2006.01)
  *H04W 72/0446* (2023.01)
  *H04W 72/23* (2023.01)
(52) U.S. Cl.
  CPC ....... *H04L 5/0048* (2013.01); *H04W 72/0446* (2013.01); *H04W 72/23* (2023.01)
(58) Field of Classification Search
  CPC ... H04L 5/0091; H04L 1/1867; H04L 1/0003; H04L 5/0058; H04W 72/0446; H04W 72/23; H04W 56/0035
  See application file for complete search history.

(56) References Cited

U.S. PATENT DOCUMENTS

| | | | |
|---|---|---|---|
| 2013/0250843 A1* | 9/2013 | Zhou | H04L 1/1887 370/312 |
| 2016/0330738 A1* | 11/2016 | Eitan | H04L 27/2646 |
| 2016/0337150 A1* | 11/2016 | Larsson | H04L 1/0025 |
| 2017/0086239 A1* | 3/2017 | Kawasaki | H04W 76/14 |
| 2018/0213379 A1* | 7/2018 | Xiong | H04W 4/70 |
| 2018/0270698 A1 | 9/2018 | Babaei et al. | |
| 2018/0324010 A1* | 11/2018 | Gulati | H04L 1/0011 |
| 2019/0140729 A1 | 5/2019 | Zhang et al. | |
| 2019/0222360 A1* | 7/2019 | Nam | H04W 28/06 |
| 2019/0356451 A1* | 11/2019 | Zhang | H04L 5/0032 |
| 2020/0022172 A1 | 1/2020 | Sun et al. | |
| 2020/0052861 A1 | 2/2020 | Li et al. | |
| 2020/0067628 A1 | 2/2020 | Xu et al. | |
| 2020/0137780 A1 | 4/2020 | Kim et al. | |
| 2020/0145867 A1* | 5/2020 | Tseng | H04B 7/06954 |
| 2020/0146032 A1 | 5/2020 | Bae et al. | |
| 2020/0162303 A1* | 5/2020 | Kim | H04L 5/0082 |
| 2020/0178216 A1* | 6/2020 | Huang | H04W 72/0473 |
| 2020/0196332 A1 | 6/2020 | Yokomakura et al. | |
| 2020/0235979 A1 | 7/2020 | Yokomakura et al. | |
| 2020/0403748 A1 | 12/2020 | Yokomakura | |
| 2021/0091902 A1 | 3/2021 | Yamada et al. | |
| 2021/0168011 A1 | 6/2021 | Davydov et al. | |
| 2021/0250870 A1* | 8/2021 | Iwai | H04W 72/23 |

OTHER PUBLICATIONS

Office Action issued in counterpart Japanese Patent Application No. 2020-520359 mailed on Apr. 18, 2023 (8 pages).
3GPP TSG RAN WG1 Meeting 92bis; R1-1805110 "Further comments on PT-RS" Nokia, Nokia Shanghai Bell; Sanya, P.R. China, Apr. 16-20, 2018 (9 pages).
Office Action issued in the counterpart Colombian Application No. NC2020/0014592, mailed Aug. 18, 2023 (16 pages).
Office Action issued in the counterpart Chinese Application No. 201980034504.6, mailed Jun. 29, 2023 (14 pages).
Office Action issued in the counterpart African Application No. AP/P/2020/012839, mailed Jul. 27, 2023 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)"; Mar. 2010 (149 pages).
International Search Report issued in PCT/JP2019/020402 mailed on Jul. 16, 2019 (1 page).
Written Opinion of the International Searching Authority issued in PCT/JP2019/020402 mailed on Jul. 16, 2019 (3 pages).
Extended European Search Report issued in counterpart European Patent Application No. 19806552.6, mailed on Feb. 7, 2022 (9 pages).
3GPP TS 38.214 V15.1.0; "3rd Generation Partnership Project; Technical Specification Group Radio Access Network; NR; Physical layer procedures for data (Release 15)"; Mar. 2018 (77 pages).
Nokia, Nokia Shanghai Bell; "Further comments on PT-RS"; 3GPP TSG RAN WG1 Meeting #93, R1-1807197; Busan, Korea; May 21-25, 2018 (7 pages).
Vivo; "Remaining issue on PT-RS"; 3GPP TSG RAN WG1 Meeting #92bis, R1-1803824; Sanya, China; Apr. 16-20, 2018 (9 pages).
Office Action issued in the counterpart ARIPO Patent Application No. AP/P/2020/012839, mailed on Jun. 8, 2022 (4 pages).
Office Action issued in Russian Application No. 2020140101/07(074580) mailed on Jul. 18, 2022 (12 pages).
Office Action issued in Indian Application No. 202037050965 mailed on Aug. 16, 2022 (5 pages).
Panasonic: "Remaining issues on PT-RS", 3GPP TSG RAN WG1 Meeting #92bis; R1-1806154; Busan, Korea, May 21-25; Agenda item: 7.1.2.3.4; Total pp. 6 (Year: 2018).
Office Action issued in Chinese Application No. 201980034504.6; Dated Dec. 29, 2023 (11 pages).
Office Action issued in Colombian Application No. NC2020/0014592; Dated Feb. 5, 2024 (17 pages).
Office Action issued in Chinese Application No. 201980034504.6, mailed on May 6, 2024 (15 pages).
Office Action issued in Colombian Application No. NC2020/0014592, mailed on May 17, 2024 (17 pages).
Office Action issued in counterpart European Patent Application No. 19 806 552.6 mailed on Feb. 6, 2025 (7 pages).
Intel Corporation; "Remaining Issues on PT-RS"; 3GPP TSG RAN WG1 Meeting AH 1801, R1-1800317; Vancouver, Canada; Jan. 22-26, 2018 (9 pages).
Panasonic; "Remaining issues on PT-RS"; 3GPP TSG RAN WG1 Meeting #92bis, R1-1804273; Sanya, China; Apr. 16-20, 2018 (5 pages).
Office Action in Korean Patent Application No. KR10-2020-7034857, dated Sep. 27, 2024 (8 pages).
3GPP TSG RAN WG1 Meeting AH 1801; R1-1800394; Lenovo, Motorola Mobility; "Corrections on PTRS"; Vancouver, Canada, Jan. 22-26, 2018 (10 pages).

* cited by examiner

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

FIG. 1

| MCS Index $I_{MCS}$ | Modulation Order $Q_m$ | Target code Rate $R$ x [1024] | Spectral efficiency |
|---|---|---|---|
| 0 | 2 | 120 | 0.2344 |
| 1 | 2 | 193 | 0.3770 |
| 2 | 2 | s 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

FIG. 2

| MCS Index $I_{MCS}$ | Modulation Order $Q_m$ | Target code Rate R x 1024 | Spectral efficiency |
|---|---|---|---|
| 0 | q | 240/ q | 0.2344 |
| 1 | q | 314/ q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |
| 31 | 6 | reserved | |

FIG. 3

| Scheduled MCS | Time density ($L_{PT-RS}$) |
|---|---|
| $I_{MCS}$ < ptrs-MCS$_1$ | PT-RS is not present |
| ptrs-MCS1 $\leq$ $I_{MCS}$ < ptrs-MCS2 | 4 |
| ptrs-MCS2 $\leq$ $I_{MCS}$ < ptrs-MCS3 | 2 |
| ptrs-MCS3 $\leq$ $I_{MCS}$ < ptrs-MCS4 | 1 |

FIG. 4

TERMINAL, RADIO COMMUNICATION METHOD, AND SYSTEM

CROSS-REFERENCE TO RELATED APPLICATIONS

The present application is a continuation application and, thereby, claims benefit under 35 U.S.C. § 120 to U.S. patent application Ser. No. 17/057,475 filed on Nov. 20, 2020, titled "TERMINAL, RADIO COMMUNICATION METHOD, BASE STATION, AND SYSTEM," which is a national stage application of PCT Application No. PCT/JP2019/020402, filed on May 23, 2019, which claims priority to Japanese Patent Application No. 2018-110697, filed on May 23, 2018. The contents of the priority applications are incorporated by reference in their entirety.

TECHNICAL FIELD

The present disclosure relates to a terminal, a radio communication method, and a system in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In the existing LTE systems (for example, 3GPP Rel. 8 to Rel. 14), a user terminal (UE (User Equipment)) controls reception of a downlink shared channel (for example, PDSCH (Physical Downlink Shared Channel)), based on downlink control information (DCI) (also referred to as the DL assignment, or the like) from a radio base station. A user terminal also controls transmission of an uplink shared channel (for example, PUSCH (Physical Uplink Shared Channel)), based on DCI (also referred to as the UL grant, or the like).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

With regard to future radio communication systems (for example, NR), a study is underway about transmission of phase tracking reference signals (PTRS) by base stations (for example, gNBs) in the downlink. Moreover, a study is underway about controlling the time domain density of PTRS based on a modulation and coding scheme (MCS) index that is indicated in DCI.

However, how an MCS index is determined when uplink control information (UCI) is transmitted utilizing an uplink shared channel (for example, PUSCH) in which UL data (for example, UL-SCH) are not multiplexed (UCI on PUSCH without data) has not been fully discussed. This leads to a problem of how to determine the time domain density of PTRS. A failure of appropriate transmission of PTRS (for example, a case that the time domain density of PTRS is failed to be appropriately determined) may deteriorate communication quality.

Thus, an object of the present disclosure is to provide a user terminal and a radio communication method that can appropriately control transmission of PTRS.

Solution to Problem

A user terminal according to an aspect of the present disclosure includes: a control section that controls, when retransmitting an uplink shared channel, determination of time density of a phase tracking reference signal (PTRS) based on whether a modulation and coding scheme (MCS) index is included in a range that is larger than a certain value; and a transmitting section that transmits the PTRS.

Advantageous Effects of Invention

According to an aspect of the present disclosure, it is possible to appropriately control transmission of PTRS.

BRIEF DESCRIPTION OF DRAWINGS

FIG. 1 is a diagram to show an example of an MCS table;
FIG. 2 is a diagram to show an example of the MCS table;
FIG. 3 is a diagram to show an example of the MCS table;
FIG. 4 is a diagram to show an example of a table representing correspondence between MCS indices and time domain densities of PTRS.

DESCRIPTION OF EMBODIMENTS

Figure 5:
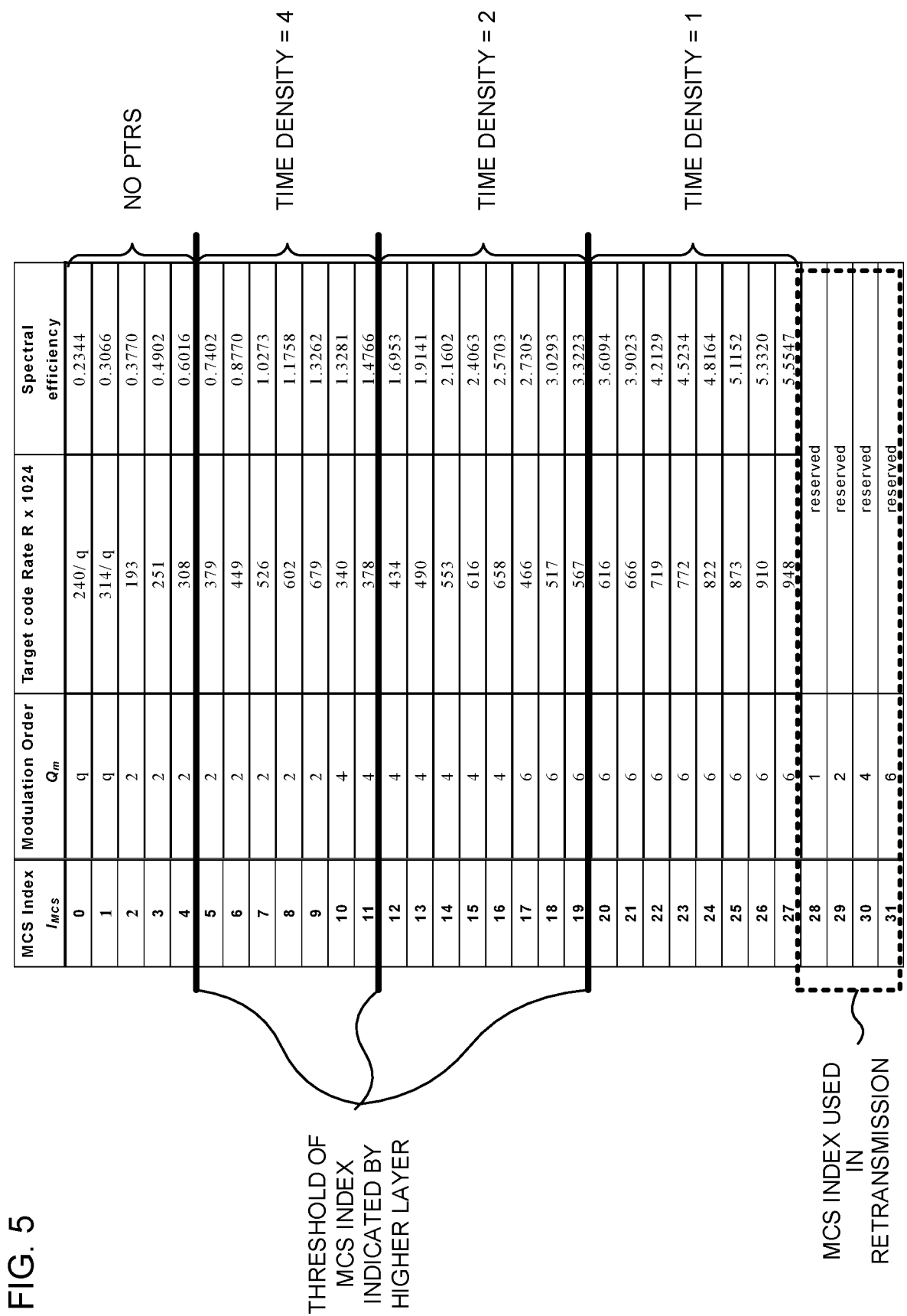
FIG. 5 is a diagram to show an example of determination of the time domain density of PTRS.

In NR, a base station (for example, gNB) transmits a phase tracking reference signal (PTRS) in the downlink. The base station may transmit the PTRS, for example, by continuously or discontinuously mapping the PTRS in a time direction in one subcarrier. The base station may transmit the PTRS during at least part of a period (a slot, a symbol. or the like) for transmitting a downlink shared channel (PDSCH (Physical Downlink Shared Channel)). The PTRS transmitted by the base station may also be referred to as a DL PTRS.

A UE transmits a phase tracking reference signal (PTRS) in the uplink. The UE may transmit the PTRS, for example, by continuously or discontinuously mapping the PTRS in a time direction in one subcarrier. The UE may transmit the PTRS during at least part of a period (a slot, a symbol. or the like) for transmitting an uplink shared channel (PUSCH (Physical Uplink Shared Channel)). The PTRS transmitted by the UE may also be referred to as a UL PTRS. Hereinafter, the UL PTRS is simply referred to as PTRS.

The UE may determine whether there is a PTRS in the uplink, based on the configuration of higher layer signaling (for example, the presence (or absence) of a PTRS-UplinkConfig information element). The UE may assume that there is a PTRS in a resource block for PUSCH. The base station may determine a phase noise and correct a phase error in a received signal, based on the PTRS transmitted from the UE.

Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CE), MAC PDUs (Protocol Data Units), and the like. The broadcast information may be, for example, master information blocks (MIBs), system information blocks (SIBs), minimum system information (RMSI (Remaining Minimum System Information)), other system information (OSI), and the like.

With regard to NR, a study is underway about controlling at least one of a modulation method (or a modulation order) and a coding rate (modulation order/coding rate) of a physical uplink shared channel (for example, PUSCH (Physical Uplink Shared Channel)) that is scheduled by downlink control information (DCI), based on a certain field (for example, a modulation and coding scheme (MCS) field) included in the DCI (UL grant, for example, DCI format 0_0, 0_1).

Specifically, a study is underway about determination, by a user terminal (UE (User Equipment), of a modulation order/coding rate for PUSCH corresponding to an MCS index indicated in the MCS field of the DCI by using a table (an MCS table) that associates MCS indices with modulation orders and TBS indices.

Here, each modulation order is a value corresponding to each modulation method. For example, the modulation orders of QPSK (Quadrature Phase Shift Keying), 16QAM (Quadrature Amplitude Modulation), 64QAM and 256QAM are respectively defined as 2, 4, 6 and 8.

FIGS. 1 to 3 are diagrams to show examples of the MCS table. Note that the values in the MCS tables illustrated in FIGS. 1 to 3 are only examples without limiting to these values. Some of the items (for example, the spectral efficiency) associated with the MCS index ($I_{MCS}$) may be omitted or another item may be added.

The user terminal may determine an MCS table to be used to determine a modulation order/coding rate for PUSCH by using at least one of following conditions (1) to (3):
(1) Transform precoding is enabled or not (whether DFT-Spread-OFDM (DFT-s-OFDM (Discrete Fourier Transform-Spread-Orthogonal Frequency Division Multiplexing)) waveform or OFDM waveform is adopted);
(2) Information indicating the MCS table (MCS table information) to be used by the user terminal indicates a specific modulation method (for example, 256QAM) or not; and
(3) Which RNTI (Radio Network Temporary Identifier) is used for DCI with CRC that is scrambled (CRC-scrambled) with the RNTI.

For example, when the DCI (for example, DCI format 0_0 or 0_1) is CRC-scrambled with a specific RNTI (for example, C-RNTI, TC-RNTI, or CS-RNTI), transform precoding is disabled, as well as, the MCS table information does not indicate 256QAM, the user terminal may determine a modulation order/coding rate corresponding to the MCS index ($I_{MCS}$) in the DCI by using the table shown in FIG. 1.

When transform precoding is disabled, as well as, the MCS table information indicates 256QAM, the user terminal may determine the modulation order/coding rate corresponding to the MCS index ($I_{MCS}$) in the DCI by using the table shown in FIG. 2.

When transform precoding is enabled, as well as, the MCS table information does not indicate 256QAM, the user terminal may determine a modulation order/coding rate corresponding to the MCS index ($I_{MCS}$) in the DCI by using the table shown in FIG. 3.

Note that, for example, when the user terminal satisfies a specific condition in FIG. 3 (for example, BPSK is supported), the modulation order q corresponding to the specific MCS index (for example, 0, 1) may be 1 (BPSK). When the above-described specific condition is not satisfied, the modulation order q may be 2 (QPSK).

When transform precoding is enabled, as well as, the MCS table information indicates 256QAM, the user terminal may determine the modulation order/coding rate corresponding to the MCS index ($I_{MCS}$) in the DCI by using the table shown in FIG. 2.

Note that the conditions of using the tables shown in FIGS. 1 to 3 are not limited to the above conditions.

Further, with regard to NR, a study is underway about determination of the time domain density of PTRS, based on an MCS index indicated in DCI, by referring to a certain table.

FIG. 4 illustrates a table which defines correspondence between MCS indices (for example, the ranges of MCS indices) and the time densities of PTRS (hereinafter, also referred to as a certain table). For example, the time density of PTRS is 4 when the MCS index indicated in the DCI is not less than MCS 1 and less than MCS 2; the time density of PTRS is 2 when the MCS index is not less than MCS 2 and less than MCS 3, and the time density of PTRS is 1 when the MCS index is not less than MCS 3 and less than MCS 4. It is to be understood that the correspondence relationships between MCS indices and time densities (or time domain densities) of PTRS are not limited to these.

NR supports a channel state information (CSI) report that transmits as feedback, to a radio base station, the result of measurement of a channel state by the user terminal based on a reference signal for measurement as CSI at a certain timing.

The reference signal for measuring a channel state may also be referred to as, for example, CSI-RS (Channel State Information-Reference Signal) without limitation. The CSI may include at least one of CQI (Channel Quality Indicator), PMI (Precoding Matrix Indicator) and RI (Rank Indicator). The CSI may also include at least one of first CSI (CSI part 1) and second CSI (CSI part 2).

The supported CSI reports include: a periodic CSI report (P-CSI report), a CSI report using semi-persistently specified resources (SP-CSI report), and an aperiodic CSI report (A-CSI report).

When transmitting the A-CSI report, the UE transmits the A-CSI according to a CSI trigger (a CSI request) from a radio base station. For example, the UE transmits an A-CSI report at a certain timing (for example, 4 subframes) after receiving the CSI trigger.

The A-CSI trigger is included in downlink control information (DCI) that is transmitted using a downlink control channel (PDCCH (Physical Downlink Control Channel)). The DCI that includes the A-CSI trigger is a UL grant and, for example, is at least one of DCI formats 0_0 and 0_1.

In transmitting an A-CSI report, the user terminal transmits CSI by using a PUSCH that is specified by a UL grant including the A-CSI trigger. The PUSCH is also referred to as PUSCH without UL-SCH or the like, when no corresponding transport channel (also, referred to as UL-SCH (Uplink Shared Channel), uplink data, uplink user data or the like) exists.

Whether the PUSCH is PUSCH without UL-SCH or not may be indicated by a certain field (for example, a UL-SCH indicator field) in the UL grant. For example, the UL-SCH indicator field is 1 bit which may indicate whether PUSCH without UL-SCH or PUSCH with UL-SCH is employed.

In this way, the PUSCH without UL-SCH is used for transmission of uplink control information (for example, A-CSI) and may transmit a data content different from a data content transmitted on the PUSCH with UL-SCH (for example, at least one of uplink user data and higher layer control information).

It is conceivable that the determination method of the modulation order/coding rate of PUSCH may be configured differently for PUSCH with UL-SCH and for PUSCH without UL-SCH.

As such, how the MCS index is determined by DCI has not been sufficiently discussed with regard to UCI on PUSCH without data (for example, A-CSI on PUSCH without data). This leads to a problem of how to control the time domain density of PTRS for the UCI on PUSCH without data.

For example, in UCI on PUSCH without data (for example, A-CSI on PUSCH without data), when a certain MCS index (for example, an MCS index in a first range (=0 to 27)) is indicated, the time domain density of PTRS is determined according to a certain table.

Whereas, in a case of PUSCH transmission (at least including a case of UCI on PUSCH without data), any of MCS indices of 0 to 27 or any of MCS indices of 28 to 31 may be indicated in retransmission. For example, it is conceivable that a value that is not defined in a certain table (for example, MCS index of 30 or the like) is indicated. In other words, how to control PTRS transmission (for example, the time domain density of PTRS) in retransmission (for example, retransmission of at least one of PUSCH and UCI) is a problem.

Thus, the inventors of the present invention came up with the idea of controlling the method of determining the time domain density of PTRS, based on a region in which the indicated MCS index is included (for example, included in either a first range or a second range). The first range may be MCS index 0 to 27, and the second range may be MCS index 28 to 31. Alternatively, the first range may be MCS index 0 to 28, and the second range may be MCS index 29 to 31. It is to be understood that the MCS indices are not limited to these examples.

Embodiments according to the present disclosure will be described in detail with reference to the drawings as follows. The aspects according to the present embodiment may be employed independently or may be employed in combination. Although the following configuration will be described using PUSCH transmission without data (for example, UL-SCH) as an example, the configuration may be applied to PUSCH transmission with data. The following configuration may be applied to CP-OFDM or DFT-S-OFDM. The following configuration may be applied to DL transmission or signals other than the PTRS.

(First Aspect)

In a first aspect, the time density of PTRS in retransmission (for example, PUSCH retransmission) is determined using a range in which the MCS index is included and at least one of certain rules.

In retransmission, when a indicated MCS index is included in a first range (for example, 0 to 27 (or 0 to 28)), the UE determines the time domain density of PTRS, based on the indicated MCS index and a certain table (for example, FIG. 4).

The UE may determine that the transmission is retransmission when the value of a new data indicator field included in the DCI indicated to the UE is different from the value of the same field in the previous DCI. For example, the UE may determine that the transmission is retransmission when the value of the new data indicator field in the indicated DCI has changed from 0 to 1 or 1 to 0.

Whereas, when the MCS index is included in the first range (for example, 28 to 31 (or 29 to 31)), the UE may adopt at least one of following rules 1-1, 1-2, and 1-3.

<Rule 1-1>

The UE uses the time domain density of PTRS adopted in initial transmission. In this case, the UE also adopts, in retransmission, the time density of PTRS corresponding to the MCS index (for example, any of 0 to 27) indicated in the initial transmission.

In this way, the time density of PTRS can be appropriately determined in retransmission, even if the time density of PTRS is a value that is not defined as an MCS index in a certain table.

<Rule 1-2>

The UE determines time domain density according to a certain conversion method, based on the time domain density of PTRS adopted in initial transmission.

For example, the UE uses the time domain density of PTRS in a different row in a certain table (for example, FIG. 4) from the row adopted in the initial transmission. As an example, the UE uses the time domain density of PTRS in a row up or down the row adopted in the initial transmission.

Setting the time domain density of PTRS adopted in retransmission smaller than the time domain density in initial transmission, lowers the coding rate, thereby improving characteristics. On the other hand, setting the time domain density of PTRS adopted in retransmission larger than the time domain density in initial transmission, facilitates gaining of phase noise correction effects more effectively and improves characteristics.

<Rule 1-3>

Figure 6:
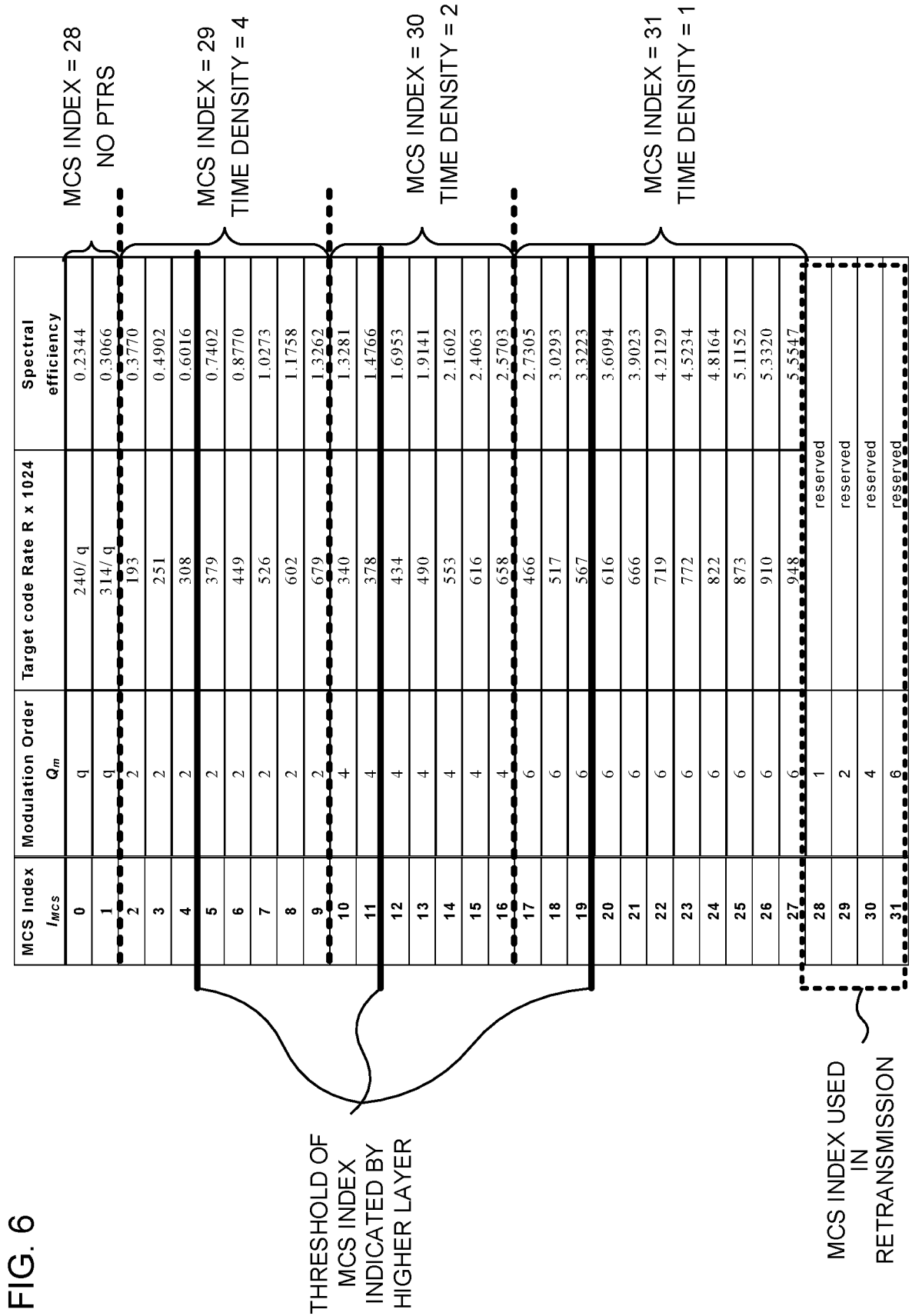
FIG. 6 is a diagram to show another example of determination of the time domain density of PTRS.
Figure 7:
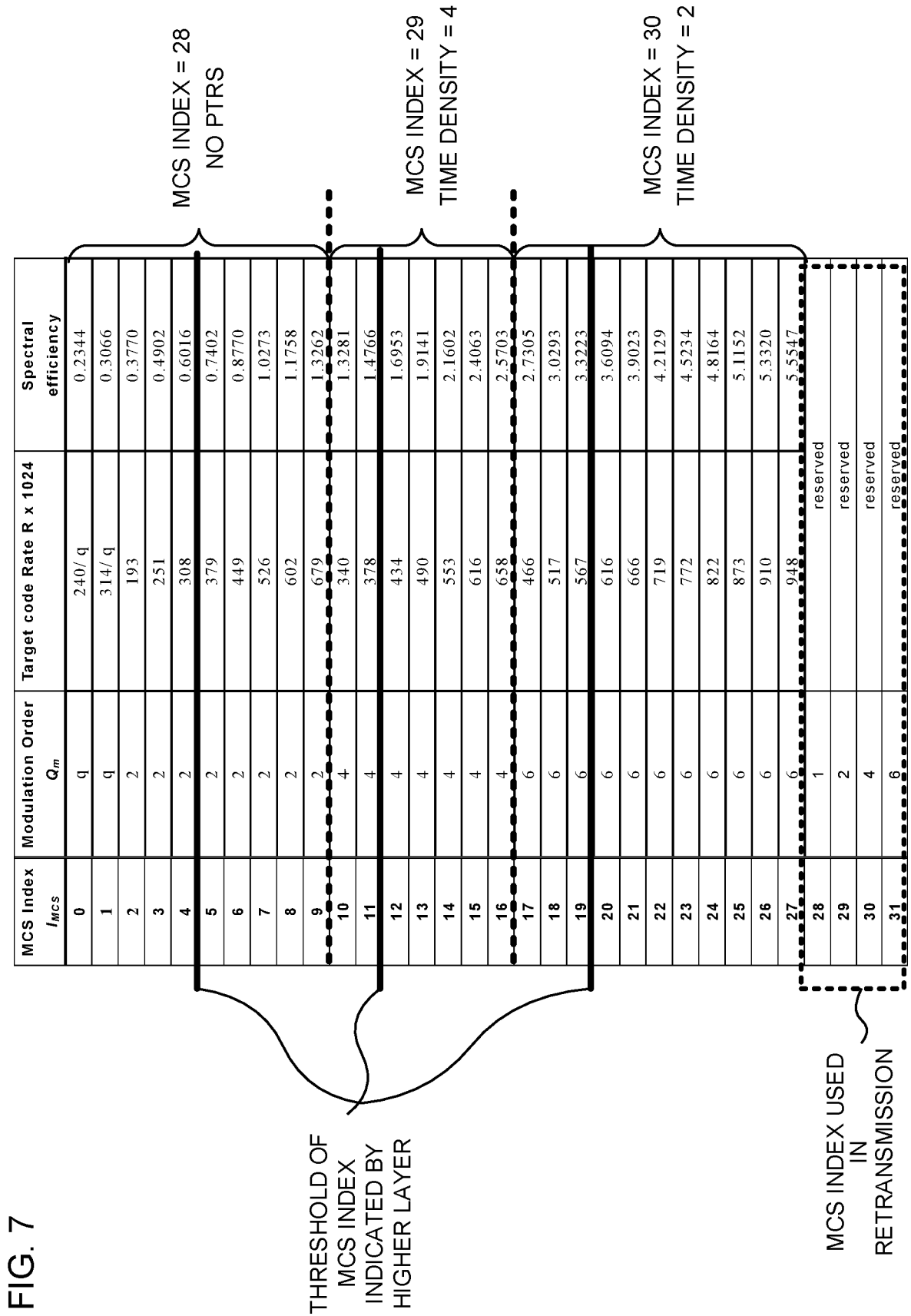
FIG. 7 is a diagram to show still another example of determination of the time domain density of PTRS.

The UE determines the time domain density of PTRS by using an MCS index indicated in retransmission, a certain table, and a certain conversion formula (refer to FIGS. 5 to 7). FIG. 5 corresponds to a table that is used in initial transmission, and FIGS. 6 and 7 correspond to tables that are used in the retransmission. In this example, the MCS index that is used (indicated to the UE) in the initial transmission is within the range of 0 to 27, and the MCS index that is used (indicated to the UE) in the retransmission is within the range of 28 to 31, without limitation to these.

For example, the UE may determine the time domain density of PTRS in retransmission according to a modulation order indicated with the MCS index of 28 to 31 and an MCS index threshold that is indicated in a higher layer.

In this example, as the MCS index thresholds that are indicated in a higher layer (for example, RRC signaling), values between MCS indices 4 and 5, between MCS indices 11 and 12, and between MCX indices 19 and 20 are exemplified, without limiting the thresholds and configured values of MCS indices to these.

FIGS. 6 and 7 show a case where the UE determines the time domain density of PTRS in retransmission, based on the modulation order which corresponds to the indicated MCS index (any of 28 to 31) (in this example, 28 corresponds to 'q;' 29, '2;' 30, '4;' and 31, '6').

For example, in FIG. 6, the UE assumes that there is no PTRS (no presence of PTRS) when the modulation order is 'q' (MCS index=28). The UE assumes that the time domain density of PTRS is 4 when the modulation order is '2' (MCS index=29). The UE assumes that the time domain density of PTRS is 2 when the modulation order is '4' (MCS index=30). The UE assumes that the time domain density of PTRS is 1 when the modulation order is '6' (MCS index=31).

In FIG. 7, the UE assumes that there is no PTRS (no presence of PTRS) when the MCS index is 28. The UE assumes that the time domain density of PTRS is 4 when the MCS index is 29. The UE assumes that the time domain density of PTRS is 2 when the MCS index is 30.

Alternatively, in FIG. 7, the UE assumes that there is no PTRS (no presence of PTRS) when the MCS index is 28 or 29. The UE assumes that the time domain density of PTRS is 4 when the MCS index is 30. The UE may assume that the time domain density of PTRS is 2 when the MCS index is 31.

In this way, when an MCS index within the range of 28 to 31 is indicated in retransmission, the time density of PTRS can be appropriately determined by determining the time domain density of PTRS by using the MCS index, a certain table, and a certain conversion formula, even if the value is not defined in the certain table.

(Second Aspect)

In a second aspect, the time domain density of PTRS is determined in accordance with a certain rule when an MCS index indicated in initial transmission is included in a certain range (for example, 28 to 31 (or 29 to 31)).

For example, in the initial transmission, when an MCS index included in DCI is included in a certain range (for example, 28 to 31), the UE determines the time domain density of PTRS according to the indicated MCS index, a certain table, and a certain conversion formula (refer to FIG. 5). For example, the UE may adopt rule 1-3 in the above-described first aspect (retransmission may be replaced with initial transmission).

For example, the UE may determine the time domain density of PTRS according to a indicated MCS index and an MCS index threshold that is indicated in a higher layer. As an example, the UE assumes that there is no PTRS (no presence of PTRS) when the indicated MCS index is 28. The UE assumes that the time domain density of PTRS is 4 when the MCS index is 29. The UE assumes that the time domain density of PTRS is 2 when the MCS index is 30. The UE assumes that the time domain density of PTRS is 1 when the MCS index is 31.

In this way, the time density of PTRS can be appropriately determined, even if the value that is indicated in initial transmission is not defined in a certain table as an MCS index.

(Variation)

The value of PTRS-UL configuration (for example, PTRS-UplinkConfig) indicated from a base station to the UE may use 0 to 27. In this way, unnecessary RRC bits can be removed compared with a case of configuring PTRS-UplinkConfig in the range of 0-29 as has been conventionally considered. The PTRS-UL configuration may be transmitted using a higher layer (for example, RRC signaling or the like).

(Radio Communication System)

Hereinafter, a structure of a radio communication system according to the embodiment of the present disclosure will be described. In this radio communication system, the radio communication method illustrated in above-described embodiment may be used alone or may be used in combination for communication.

Figure 8:
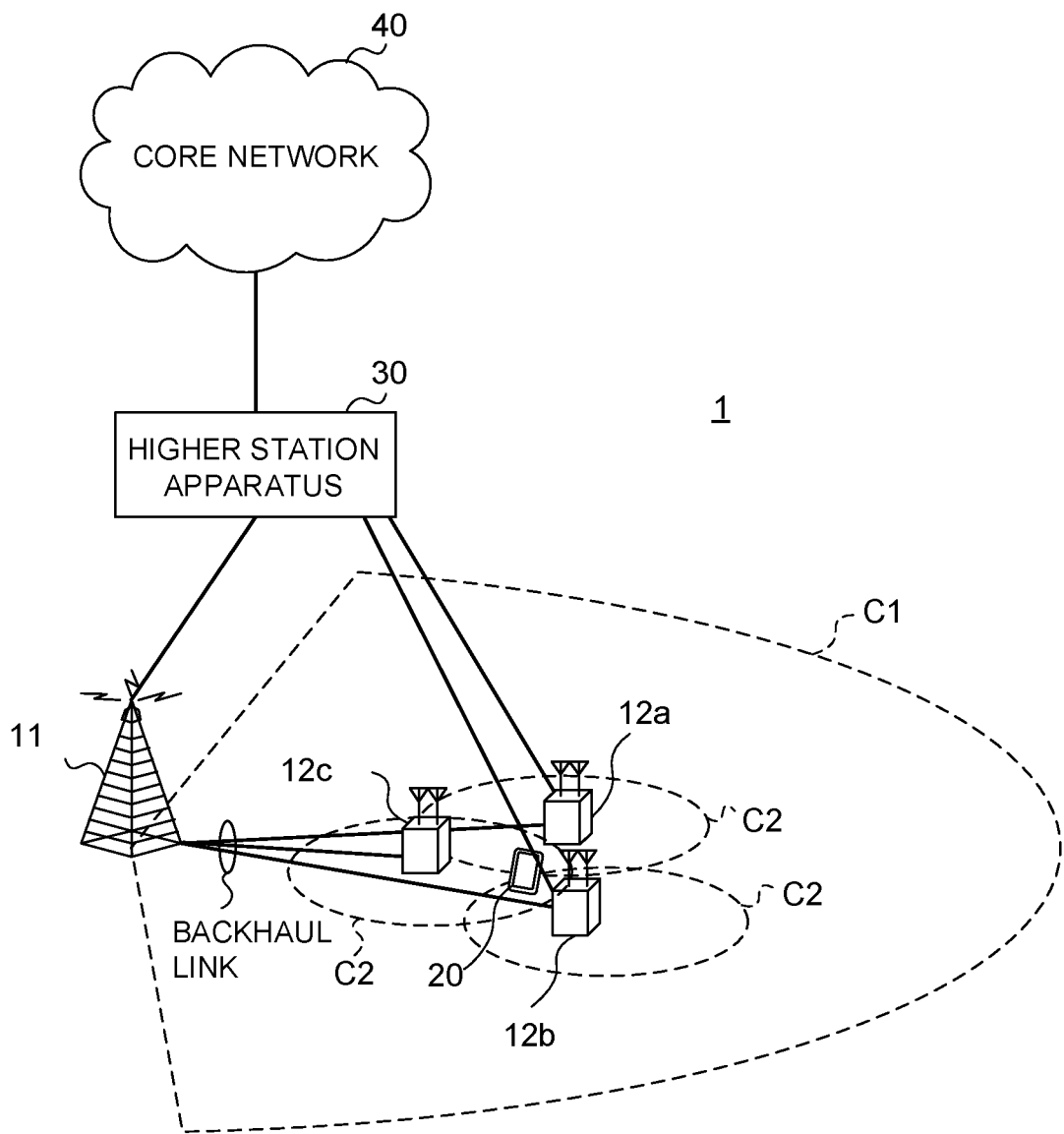
FIG. 8 is a diagram to show an example of a schematic structure of a radio communication system according to one embodiment.

FIG. 8 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LIE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs) (for example, five CCs or less, or six CCs or more).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on.

For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include at least one of a downlink control channels (a PDCCH (Physical Downlink Control Channel), and/or an EPDCCH (Enhanced Physical Downlink Control Channel)), a PCFICH (Physical Control Format Indicator Channel), and a PHICH (Physical Hybrid-ARQ Indicator Channel). Downlink control information (DCI), including PDSCH and/or PUSCH scheduling information, and so on are communicated on the PDCCH.

Note that the scheduling information may be indicated by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio link quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 9:
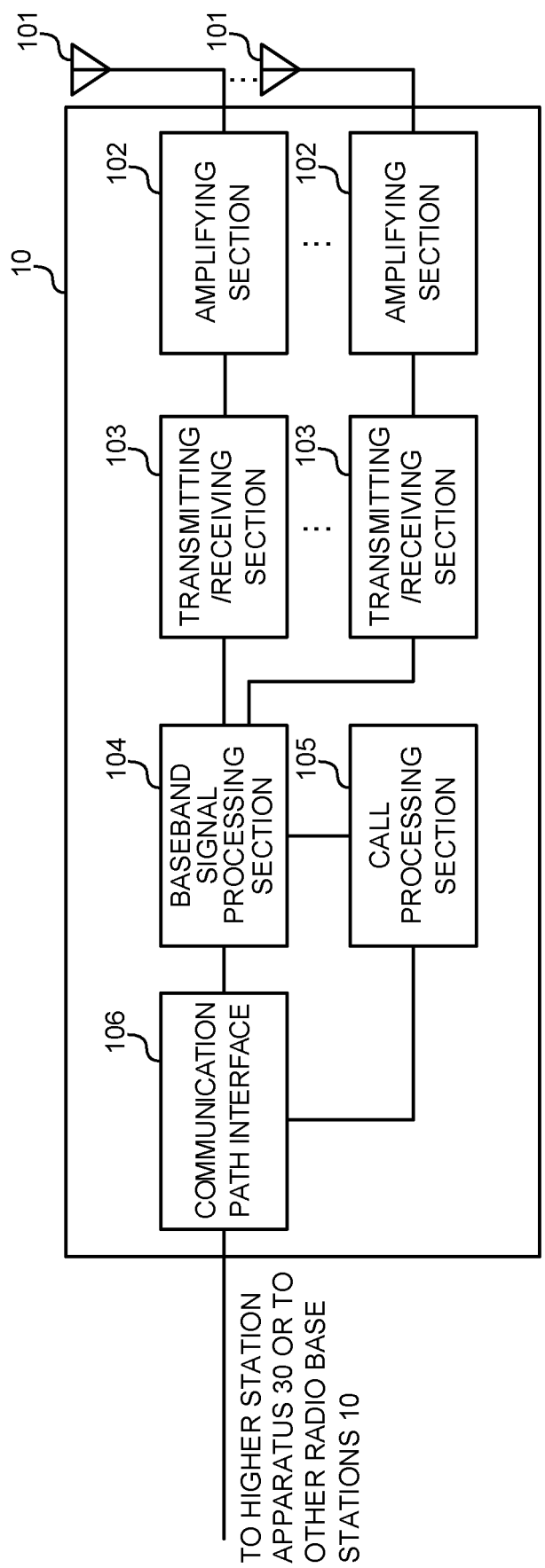
FIG. 9 is a diagram to show an example of an overall structure of a radio base station according to one embodiment.

FIG. 9 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 receives a phase tracking reference signal (PTRS) for an uplink control channel that is used in transmission of uplink control information without data.

Figure 10:
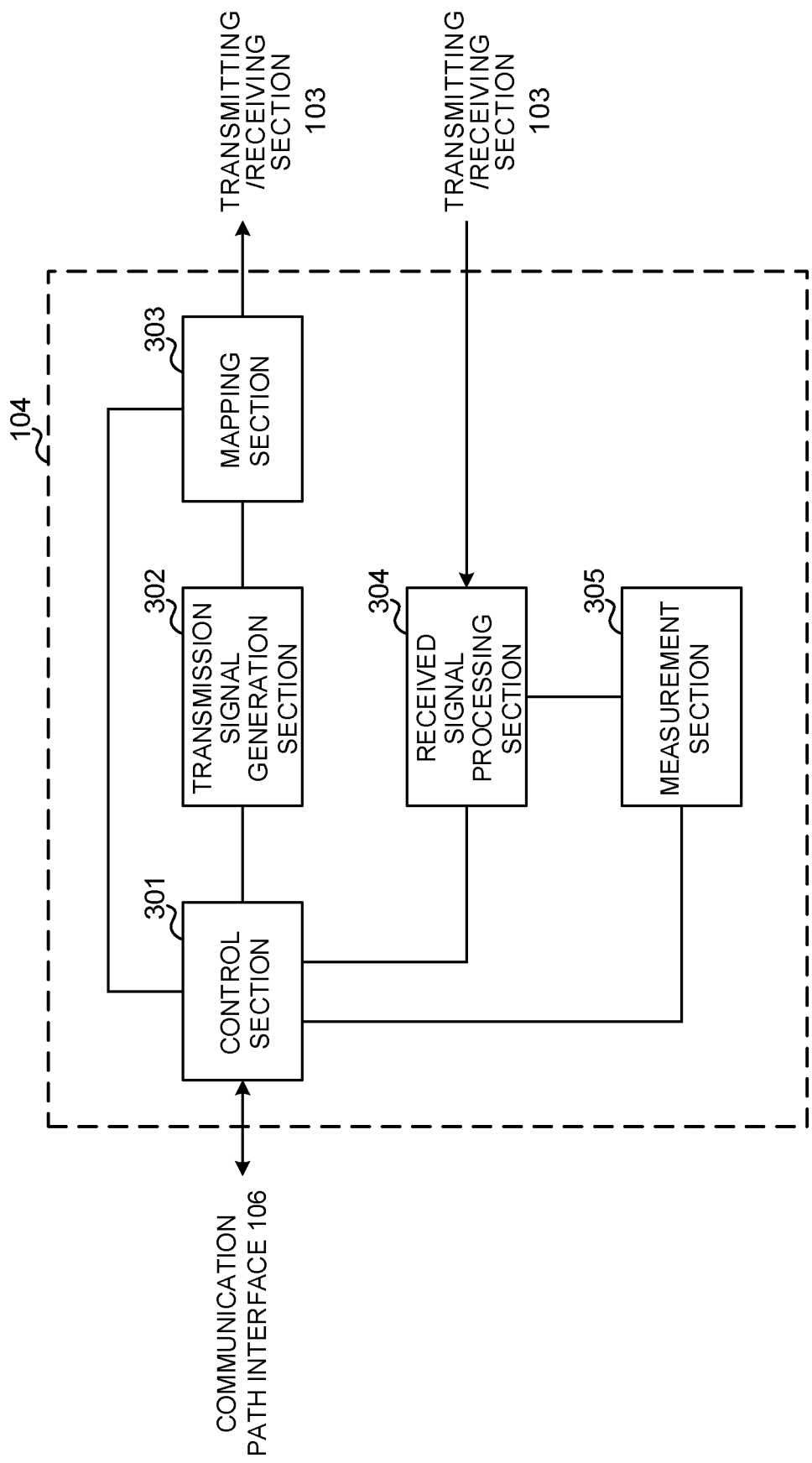
FIG. 10 is a diagram to show an example of a functional structure of the radio base station according to one embodiment.

FIG. 10 is a diagram to show an example of a functional structure of the radio base station according to one embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS/SSS), a downlink reference signal (for example, CRS, CSI-RS, DMRS), and so on.

The control section 301 determines a determination method of the time domain density of PTRS in the UE, based on whether a modulation and coding scheme (MCS) index indicated in the downlink control information is included in a certain range (for example, either the first range or the second range).

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) or the like from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 11:
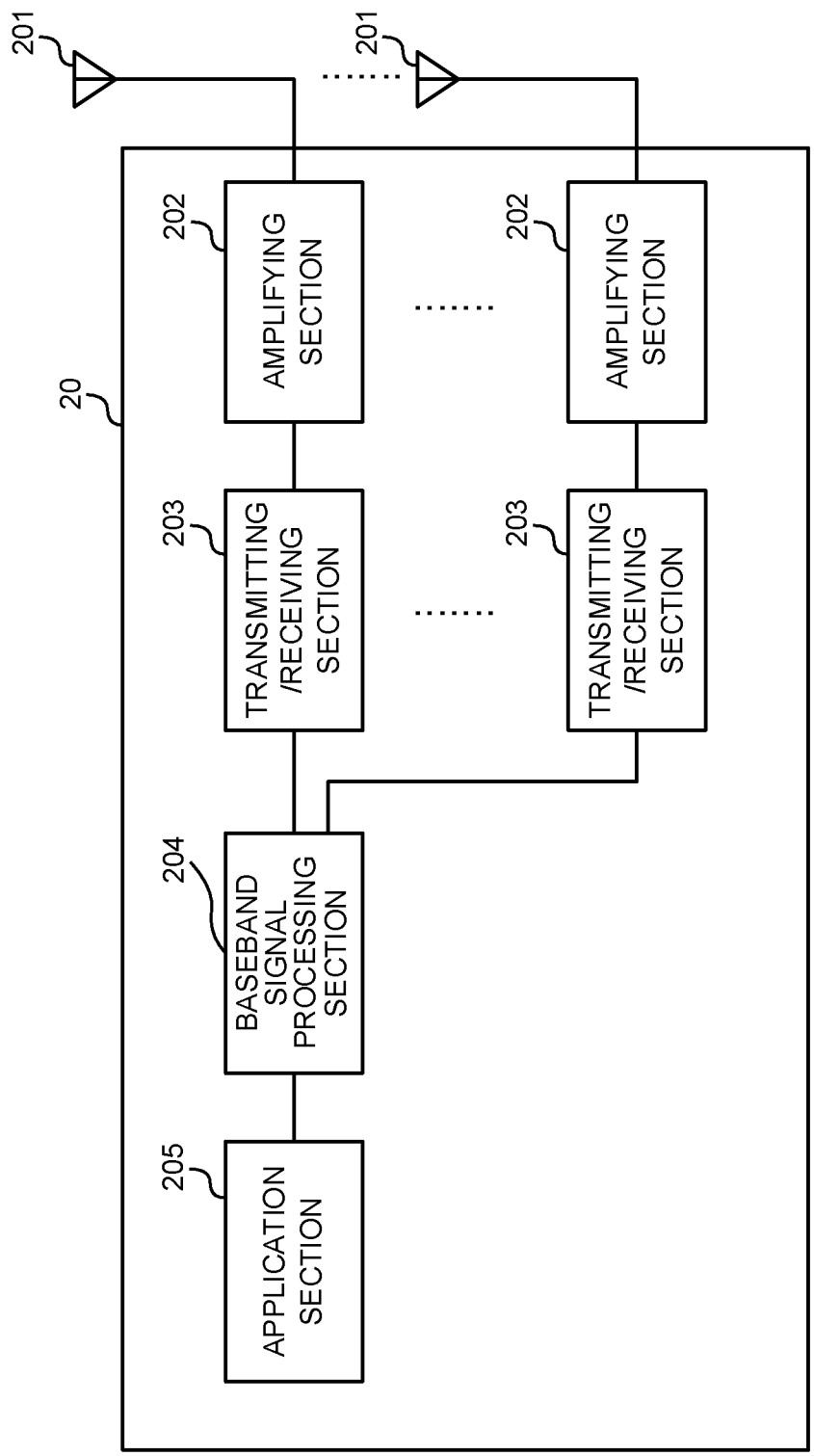
FIG. 11 is a diagram to show an example of an overall structure of a user terminal according to one embodiment.

FIG. 11 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 transmits a phase tracking reference signal (PTRS) for an uplink control channel that is used in transmission of uplink control information without data.

Figure 12:
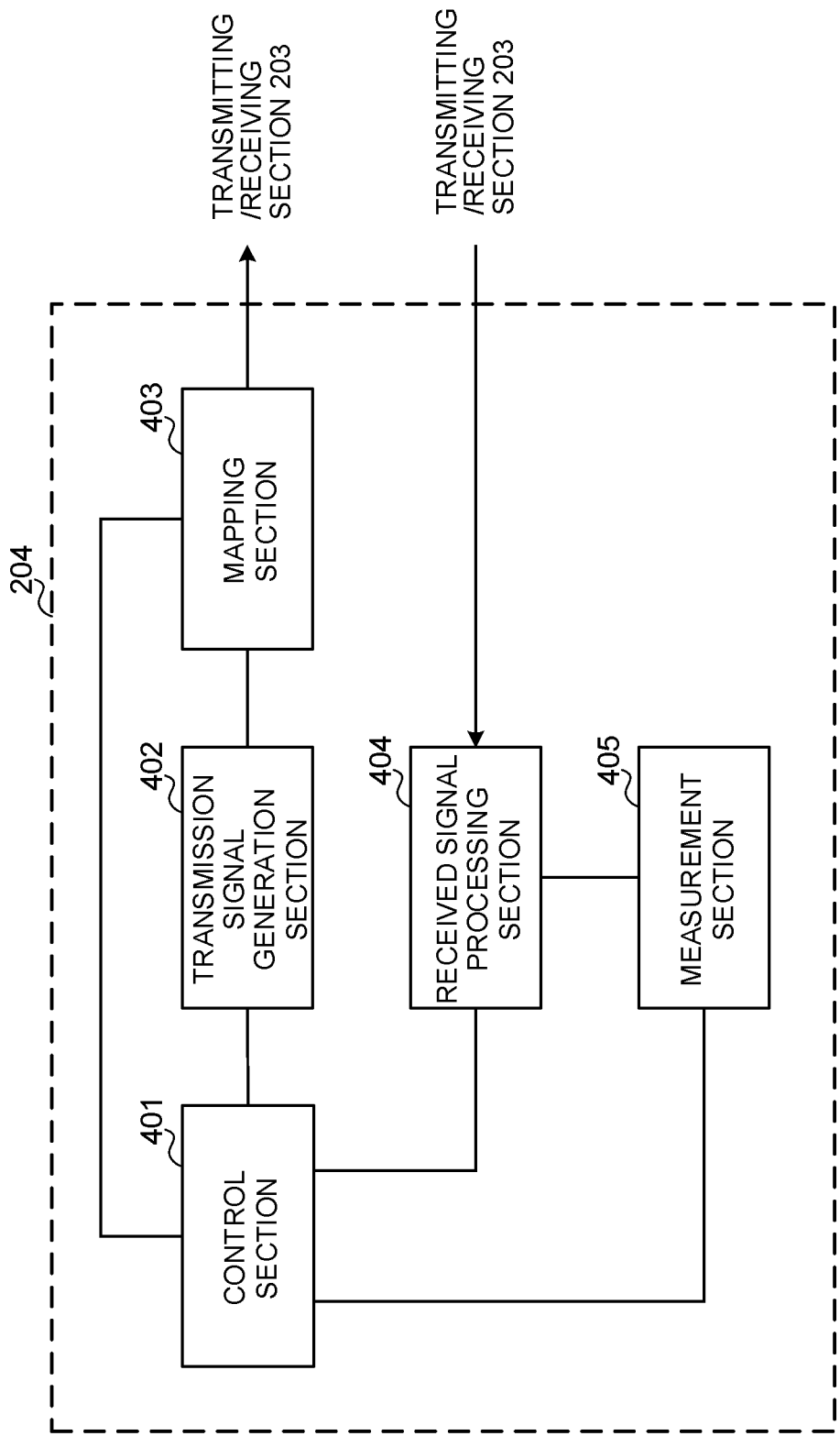
FIG. 12 is a diagram to show an example of a functional structure of a user terminal according to one embodiment.

FIG. 12 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

If the control section 401 acquires a variety of information indicated by the radio base station 10 from the received signal processing section 404, the control section 401 may update parameters to use for control, based on the information.

The control section 401 determines a determination method of the time domain density of PTRS, based on whether a modulation and coding scheme (MCS) index indicated in the downlink control information is included in a certain range (for example, either the first range or the second range).

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is indicated from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 13:
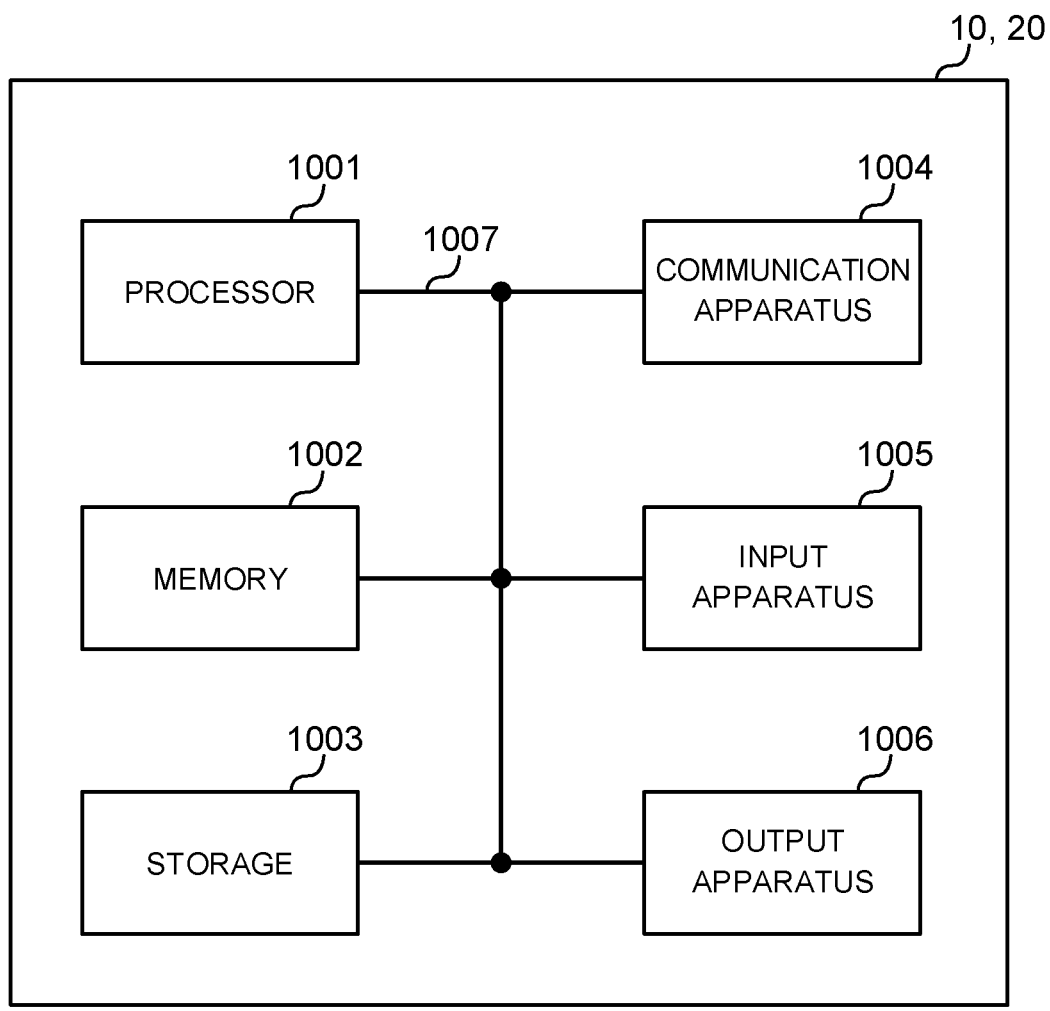
FIG. 13 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 13 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH and a PUSCH transmitted in a time unit larger than a mini-slot may be referred to as "PDSCH/PUSCH mapping type A." A PDSCH and a PUSCH transmitted using a mini-slot may be referred to as "PDSCH/PUSCH mapping type B."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure may be used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," a "cell," a "sector," a "cell group," a "carrier," a "component carrier," a "bandwidth part (BWP)," and so on can be used interchangeably. The base station may be referred to as the terms such as a "macro cell," a small cell," a "femto cell," a "pico cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal," and the like may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation.

Furthermore, the radio base station in the present disclosure may be interpreted as a user terminal. For example, each aspect/embodiment of the present disclosure may be applied to the structure that replaces a communication between a radio base station and a user terminal with a communication between a plurality of user terminals (for example, which may be referred to as "D2D (Device-to-Device)," "V2X (Vehicle-to-Everything)," and the like). In this case, the user terminals 20 may have the functions of the radio base stations 10 described above. The words "uplink" and "downlink" may be interpreted as the words corresponding to the terminal-to-terminal communication (for example, "side"). For example, an uplink channel may be interpreted as a side channel.

Likewise, the user terminal in the present disclosure may be interpreted as radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation.

The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, next-generation systems that are enhanced based on these and so on. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections, or the like and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure or in claims, these terms are intended to be inclusive, in a manner similar to the way the term "comprising" is used. Furthermore, the term "or" as used in the present disclosure or in claims is intended to be not an exclusive disjunction.

For example, in the present disclosure, when an article such as "a," "an," and "the" in the English language is added by translation, the present disclosure may include that a noun after these articles is in a plural form.

(Supplementary Note)

Supplementary notes of the present disclosure are added.

<Background Art>

Time Domain Density of PTRS

Determined based on an MCS index and a certain table.

MCS Index

Reported in DCI.

UCI on PUSCH without Data

How an MCS index is determined in DCI is not defined, and, thus, there is no method for determining the PTRS time domain density in UCI on PUSCH without data.

UL-SCH indicator reports whether there is UL data or not using 1 bit, and MCS is determined by the $I_{MCS}$ field bit in DCI.

<Problem>

In UCI on PUSCH without data (for example, A-CSI on PUSCH without data), when an MCS index in the range of 0 to 27 is reported, the PTRS time domain density is determined according to a certain table.

In a case of PUSCH transmission (at least including a case of UCI on PUSCH without data), an MCS index within the range of 0 to 27 may be reported or an MCS index within the range of 28 to 31 may be reported in retransmission.

The method of determining PTRS (for example, time domain density) in retransmission is not defined.

<Suggestion 1>

In retransmission, in other words, when the value of the new data indicator field in reported DCI is different from the value of the same field in the previous DCI (for example, the value of the new data indicator field in the reported DCI is changed from 0 to 1 or 1 to 0), as well as, the MCS index within the range of 0 to 27 is reported, the UE determines the time domain density of PTRS according to the reported MCS index and a certain table.

When an MCS index within the range of 28 to 31 is reported, any of following suggestions 1-1, 1-2, 1-3 is adopted.

Suggestion 1-1

The time domain density of PTRS used in initial transmission is used.

Suggestion 1-2

Time domain density is determined according to a certain conversion method, based on the time domain density of PTRS used in initial transmission.

<<Suggestion 1-2-1>>

A row up the row used in the initial transmission, in a certain table, is used. This lowers the density and the coding rate, thereby improving characteristics.

<<Suggestion 1-2-2>>

A row down the row used in the initial transmission, in a certain table, is used. This increases the density and facilitates gaining of phase noise correction effects more effectively, thereby improving characteristics.

Suggestion 1-3

The time domain density of PTRS is determined according to an MCS index reported in retransmission, a certain table, and a certain conversion formula (refer to FIGS. 5 to 7).

For example, the time domain density of PTRS in retransmission is determined according to a modulation order reported by MCS index within the range of 28 to 31 and an MCS index threshold reported in a higher layer. As an example, as shown in FIG. 6 or 7, the time domain density of PTRS in retransmission is determined according to the modulation order corresponding to the MCS index within the range of 28 to 31 and the MCS index threshold reported in a higher layer.

<Suggestion 2>

The time domain density of PTRS may be determined using above-described suggestion 1-3 when an MCS index within the range of 28 to 31 is reported in initial transmission. For example, the time domain density of PTRS is determined by the reported MCS index, a certain table, and a certain conversion formula.

<Suggestion 3>

The value of PTRS-UL configuration (for example, PTRS-UplinkConfig) reported from a base station to the UE may use 0 to 27. In this way, unnecessary RRC bit can be removed compared with a case of configuring the PTRS-UplinkConfig within the range of 0 to 29. The PTRS-UL configuration may be transmitted using a higher layer (for example, RRC signaling or the like).

In view of above, the following structures are suggested.

[Structure 1]

A user terminal including:

a transmitting section that transmits a phase tracking reference signal (PTRS) for an uplink control channel that is used for transmission of uplink control information without data (UL-SCH or transport channel); and a control section that controls a determination method of time domain density of PTRS, based on whether a modulation and coding scheme (MCS) index reported in downlink control information is included in a first range or a second range.

[Structure 2]

A radio communication method including: a step of transmitting a phase tracking reference signal (PTRS) for an uplink control channel that is used for transmission of uplink control information without data; and a step of controlling a determination method of time domain density of PTRS, based on whether a modulation and coding scheme (MCS) index reported in downlink control information is included in a first range or a second range.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that determines, when retransmission of a side channel in a communication between a plurality of terminals is performed, a modulation order for the retransmission of the side channel by using a Modulation and Coding Scheme (MCS) table based on information indicating the MCS table which indicates 256 Quadrature Amplitude Modulation (256QAM) as a modulation scheme and based on side control information;
a transmitter that transmits the side channel based on the determined modulation order; and
a receiver that receives downlink control information including at least an Uplink Shared Channel (UL-SCH) indicator field; and
wherein, the processor, if retransmission of an uplink shared channel is performed, determines a time density of a phase tracking reference signal (PTRS) based on whether a MCS index is larger than a certain value,
wherein the transmitter transmits the PTRS,
wherein the time density of the PTRS is determined according to an MCS index threshold indicated in a higher layer, and
wherein, when a value of the UL-SCH indicator field indicates an uplink shared channel without an uplink data, if the MCS index is larger than the certain value, the time density of the PTRS is determined based on an MCS index notified in an initial transmission which is smaller than or equal to the certain value, and if the MCS index is smaller than or equal to the certain value, the time density of the PTRS is determined based on the MCS index and a correspondence between MCS indices and PTRS time densities.

2. The terminal according to claim 1, wherein the processor determines that retransmission of the uplink shared channel is performed based on a field indicated in downlink control information.

3. A radio communication method comprising:
determining, when retransmission of a side channel in a communication between a plurality of terminals is performed, a modulation order for the retransmission of the side channel by using a Modulation and Coding Scheme (MCS) table based on information indicating the MCS table which indicates 256 Quadrature Amplitude Modulation (256QAM) as a modulation scheme and based on side control information;
transmitting the side channel based on the determined modulation order;
receiving downlink control information including at least an Uplink Shared Channel (UL-SCH) indicator field;
if retransmission of an uplink shared channel is performed, determining a time density of a phase tracking reference signal (PTRS) based on whether a MCS index is larger than a certain value; and
transmitting the PTRS,
wherein the time density of the PTRS is determined according to an MCS index threshold indicated in a higher layer, and
wherein, when a value of the UL-SCH indicator field indicates an uplink shared channel without an uplink data, if the MCS index is larger than the certain value, the time density of the PTRS is determined based on an MCS index notified in an initial transmission which is smaller than or equal to the certain value, and if the MCS index is smaller than or equal to the certain value, the time density of the PTRS is determined based on the MCS index and a correspondence between MCS indices and PTRS time densities.

4. A system comprising a terminal and a base station, wherein
the terminal comprises:
a processor of the terminal that determines, when retransmission of a side channel in a communication between a plurality of terminals is performed, a modulation order for the retransmission of the side channel by using a MGS Modulation and Coding Scheme (MCS) table based on information indicating the MCS table which indicates 256 Quadrature Amplitude Modulation (256QAM) as a modulation scheme and based on side control information;
a transmitter of the terminal that transmits the side channel based on the determined modulation order; and
a receiver of the terminal that receives downlink control information including at least an Uplink Shared Channel (UL-SCH) indicator field;
wherein the processor of the terminal, if retransmission of an uplink shared channel is performed, determines a time density of a phase tracking reference signal (PTRS) based on whether a MCS index is larger than a certain value,
wherein the transmitter of the terminal transmits the PTRS,
wherein the time density of the PTRS is determined according to an MCS index threshold indicated in a higher layer, and
wherein, when a value of the UL-SCH indicator field indicates an uplink shared channel without an uplink data, if the MCS index is larger than the certain value, the time density of the PTRS is determined based on an MCS index notified in an initial transmission which is smaller than or equal to the certain value, and if the MCS index is smaller than or equal to the certain value, the time density of the PTRS is determined based on the MCS index and a correspondence between MCS indices and PTRS time densities, and
the base station comprises:
a transmitter of the base station that transmits the downlink control information including at least the UL-SCH indicator field;
a processor of the base station that controls the retransmission of an uplink shared channel; and
a receiver of the base station that, if the retransmission of the uplink shared channel is performed, receives the PTRS whose time density is determined based on whether the MCS index is larger than the certain value.

* * * * *